United States Patent [19]

Bisiach

[11] Patent Number: 4,870,246
[45] Date of Patent: Sep. 26, 1989

[54] LASER BEAM ROBOT FOR CUTTING AND WELDING

[76] Inventor: Bruno Bisiach, via Mentana, 23 bis, 10133 Turin, Italy

[21] Appl. No.: 233,447

[22] Filed: Aug. 18, 1988

[30] Foreign Application Priority Data

Nov. 26, 1987 [IT] Italy ................ 68012 A/87

[51] Int. Cl.⁴ .......................................... B23K 26/08
[52] U.S. Cl. ........................ 219/121.78; 219/171.8; 219/171.79
[58] Field of Search ............. 219/121.78, 121.79, 219/121.8, 121.6, 121.85

[56] References Cited

U.S. PATENT DOCUMENTS

| | | | |
|---|---|---|---|
| 4,151,390 | 4/1979 | Bisiach | 219/124.10 |
| 4,453,883 | 6/1984 | Bisiach | 414/735 |
| 4,539,462 | 9/1985 | Plankenhorn | 219/121.79 |
| 4,542,278 | 9/1985 | Taylor | 219/121.79 |
| 4,659,279 | 4/1987 | Akeel et al. | 414/680 |
| 4,659,900 | 4/1987 | Gilli et al. | 219/121.78 X |
| 4,675,499 | 6/1987 | Nakai | 219/121.78 |
| 4,703,157 | 10/1987 | Dahlquist | 219/121.78 |
| 4,708,580 | 11/1987 | Akeel | 414/735 |

FOREIGN PATENT DOCUMENTS

| | | |
|---|---|---|
| 0061153 | 9/1982 | European Pat. Off. . |
| 0190360 | 8/1986 | European Pat. Off. . |
| 50-95928 | 2/1977 | Japan . |
| 55-136589 | 10/1980 | Japan . |
| 623732 | 9/1978 | Switzerland . |

*Primary Examiner*—C. L. Albritton
*Attorney, Agent, or Firm*—Paul & Paul

[57] ABSTRACT

The laser beam robot is mounted on a portal framework and comprises at least five axes defined as follows:

I. A horizontal linear axis for translating the robot along the portal framework;

II. an axis swinging about a center coinciding with the point onto which the laser beam generated outside the robot includes onto the robot;

III. a linear axis for translating the robot in a vertical plane;

IV-V-VI. two or three polar axes in the hollow operating head to orient and focus the laser beam according to a desired path.

The laser beam follows a rectilinear path until a mirror positioned in the swinging center of the robot arm and secured thereto, but fixed in respect of axis III. A slit allows the laser beam to strike the mirror in any position of the robot arm along the axis III. The laser beam is sent to the hollow head and from here it is reflected and focused outside the robot.

12 Claims, 4 Drawing Sheets

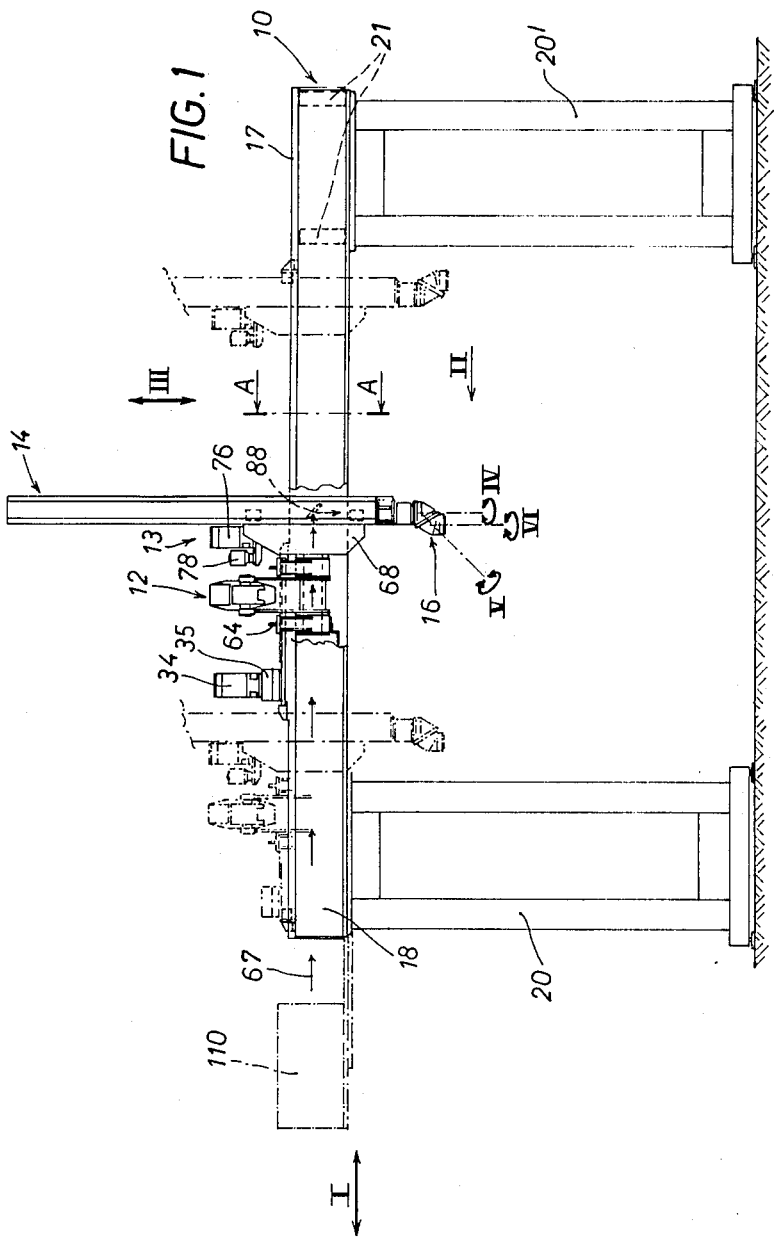

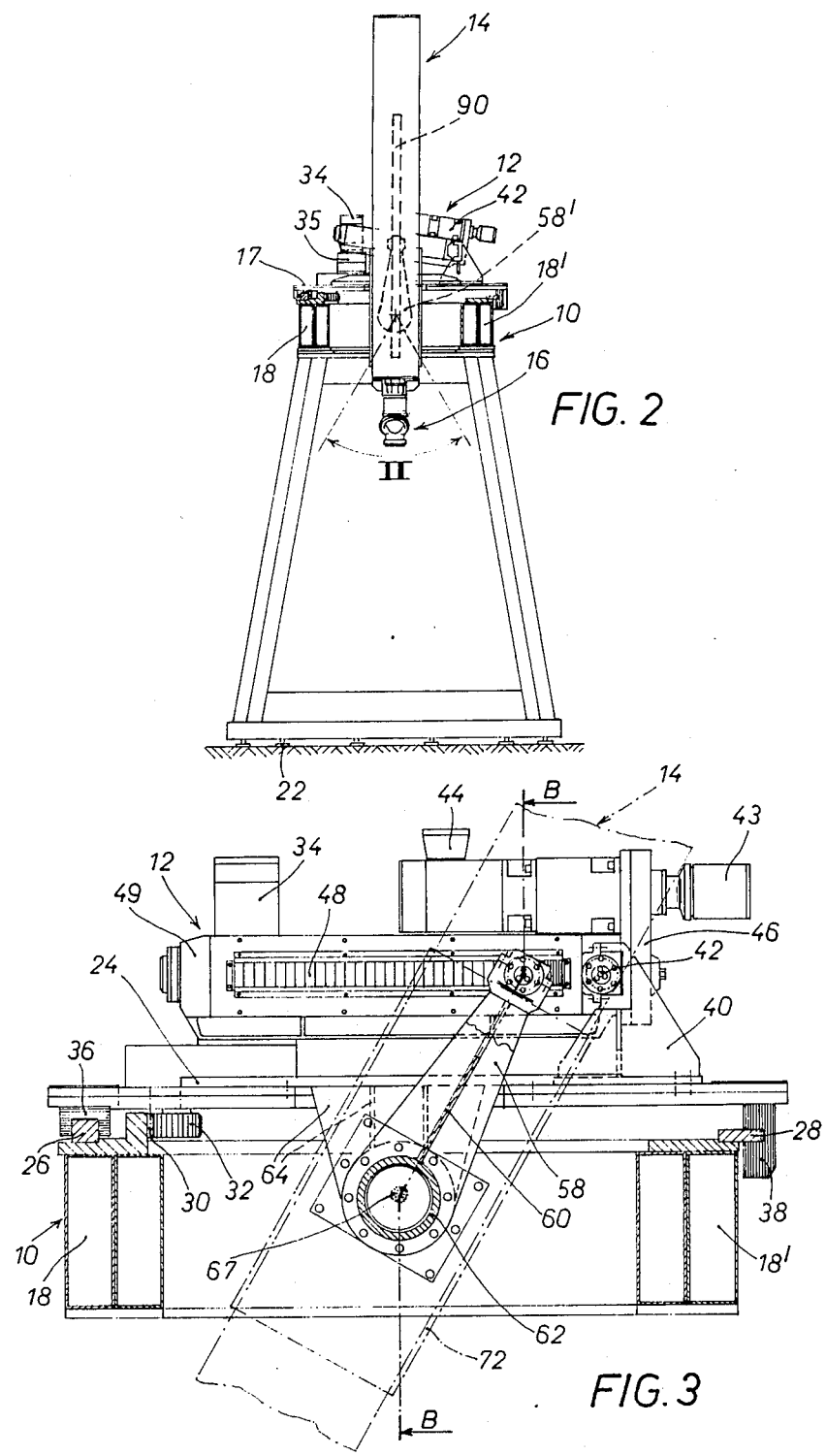

LASER BEAM ROBOT FOR CUTTING AND WELDING

BACKGROUND OF THE INVENTION

The present invention concerns a laser beam robot for cutting and welding.

The use of laser for cutting and welding metal plates is well know, as well as it is known to use a power laser for welding iron plated members in the car manufacturing.

The known robots using a power laser beam to carry out welding or cutting operations encounter a severe limitation when the laser beam has to be directed onto members to be joined or separated with large sizes and complex shapes which are not easily moved to present the robot with the parts to be joined.

SUMMARY AND OBJECTS OF THE INVENTION

The object of the present invention is therefore to overcome or reduce the shortcomings of the above mentioned known machines, by providing a cutting or welding power laser beam robot which can reach any spot inside or outside a tridimensional shape being worked, employing only its own moving means controlled by a suitable program.

A further object of the present invention is to provide a power laser beam robot with a reduced number of reflecting members in order to minimize the power losses.

The above and other objects and advantages of the invention that will become apparent from the description which follows, are achieved with a laser beam robot with a hollow operating head mounted on a portal framework with at least five axes defined as follows:

I. A horizontal rectilinear axis for translating the robot along the portal framework;
II. a swinging axis for swinging the robot in a vertical plane;
III. a linear axis for translating the robot in the same vertical plane;
IV-V. at least two polar axes in the hollow head; comprising:
   a slit overlapping the center of rotation of said swinging axis and extending on the robot side facing an external laser generator from which the laser beam exits along a rectilinear path;
   a first mirror positioned in the center of rotation of said swinging axis and secured thereto, which reflects the laser beam from the generator within the robot toward the operating head;.
   at least another reflecting mirror and a focusing unit in said hollow operating head for orienting and focusing the laser beam according to a desired path outside the robot.

BRIEF DESCRIPTION OF THE DRAWINGS

A preferred embodiment of the invention, only supplied as a non limiting example, will now be disclosed with reference to the attached drawings in which:

FIG. 1 schematically shows a front elevational view of the laser beam robot of the invention mounted on a portal framework;

FIG. 2 is a cross section view along line A-A of FIG. 1;

FIG. 3 shows a partially cross section view of the assembly controlling the robot swinging according to the invention;

DESCRIPTION OF PREFERRED EMBODIMENT

Figure 4:
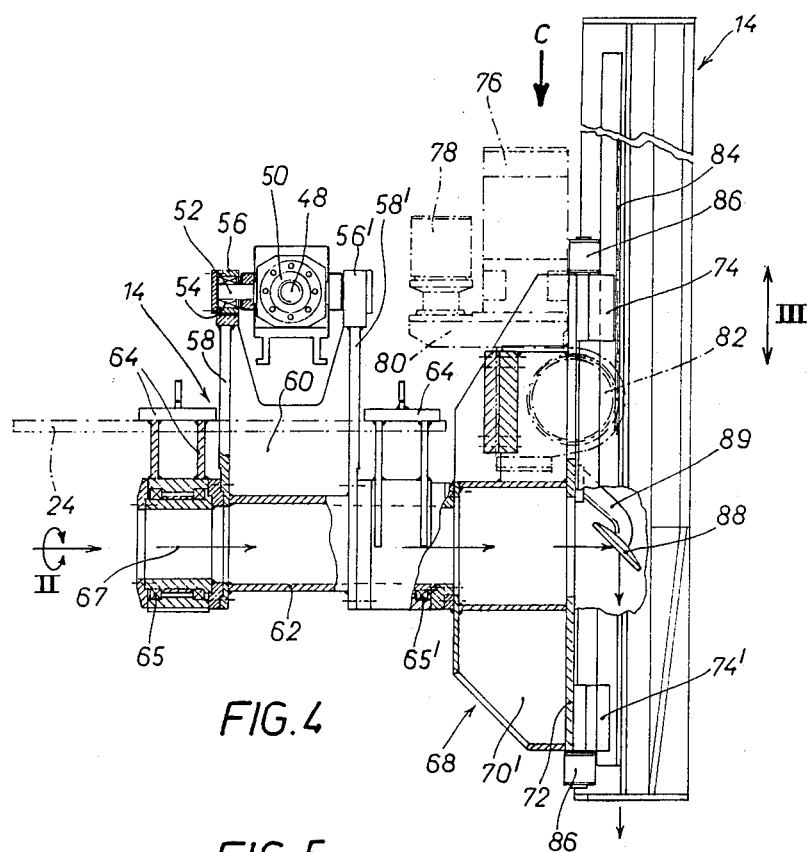
FIG. 4 is a cross section view along line B—B of FIG. 3.

In the embodiment shown in the figures, the laser beam robot according to the invention is mounted on a portal framework 10 on which there are also mounted a control assembly 12 for the swinging movements of the robot arm 14, and a guide and motor assembly 13 for linearly translating the arm 14 which carries a hollow operating head 16.

On the whole the robot is defined through five or six axes, the term "axis" meaning in the art as well as in the present description, a degree of freedom of movement; as specified in the following:

I. a horizontal rectilinear axis for translating the robot along the portal framework;
II. a swinging axis for swinging the robot in a vertical plane;
III. a linear axis for translating the robot in the same vertical plane;
IV-V. at least two polar axes in the hollow head;
VI. possibly a third polar axis in the hollow head.

The portal framework 10 substantially comprises a pair of crossbars 18, 18' forming an upper platform 17 over which the robot is slidable along its longitudinal direction, i.e. parallel to the crossbars (axis I).

The crossbars 18, 18' are joined at their respective ends by support side members 20, 20' secured to ground through feet which are adjustable in height for leveling the framework 10.

Further a pair of transverse stiffening ribs 21, orthogonally positioned with respect to crossbars 18 and 18' on side members 20, 20', strengthen the portal framework 10 by conferring to it a greater compactness and stiffness.

Over two straight guides 26 and 28, secured to the upper part of crossbars 18 and 18', slides a base 24 forming the fastening support for the control assembly 12 of the swing movement of arm 14 and for the guide and motor assembly of the translation movement for the same arm.

The rectilinear translation movement is transmitted to base 24 by a pinion 30 engaging a rack 32 positioned in the upper part of crossbar 18 and parallel to the guide 26.

An electric motor 34, comprising a not shown rotative transducer for position detecting, imparts a rotary motion to the above mentioned pinion 30 through a reduction gear unit 35.

An optimum sliding of base 24 on straight guides 26 and 28 is obtained by interposing axial circulating balls bearings 36 and 38 between said two members, as shown in FIG. 3.

With reference to FIG. 1, further to the representation of the robot in a central position on the portal framework, the same has been shown with dot and dash lines in the outermost lateral positions, in order to show the range of movement along axis I.

The sliding base 24, built as a metal frame of welded structural work, carries at one end a holder 40 supporting a rotatable pin 42 which acts as a fulcrum for the control assembly 12 of the swinging movement for arm 14 (axis II).

The control assembly 12 comprises an electric motor 43, equipped with a rotative transducer 44 as shown in FIG. 3, which through a reduction unit 46 transmits a rotary motion to a worm screw 48 coupled to a tapped sleeve 50. The worm screw 48 is inserted within a hollow body 49 and is rotatably supported at its ends through two bushes (not shown), which are also positioned inside said hollow body 49.

With reference to FIG. 4 the tapped sleeve 50 laterally carries two hinge pins 52 which in turn are inserted into a pair of bearings 54 mounted in seats 56, 56'. A pair of connecting rods 58, 58' are connected to said seats, the rods being connected at their ends by a hollow shaft 62 inside which a laser beam 67 travels along a straight path shown by a series of arrows one after the other in FIGS. 1, 4 and 5.

The hollow shaft 62 is secured to the slidable base 24 through supports marked on the whole with 64.

A pair of bearings 65, 65' coupled to the base 24 by means of the above mentioned supports 64 and mounted at the respective ends of the hollow shaft 62, allow this latter to rotate in accordance with angles defined by the displacement of the connecting rods 58, 58' connected thereto.

The rotation of motor 43 transmitted to the worm screw 48 causes a displacement of sleeve 50 along the axis of said worm screw 48 and therefore the angular displacement of the connecting rods 58, 58' connected to the sleeve 50.

During their angular displacement the connecting rods 58, 58' apply a push to the sleeve connected thereto which moves along the axis of the worm screw 48 and causes a swing movement of this latter and of the body 49 housing it, about the hinge pin 42.

The greater distance between the body 49 and the base 24 is established when the sleeve 50 reaches the middle position of the worm screw 48, and thereafter it decreases in correspondence of displacements from the middle position.

Figure 5:
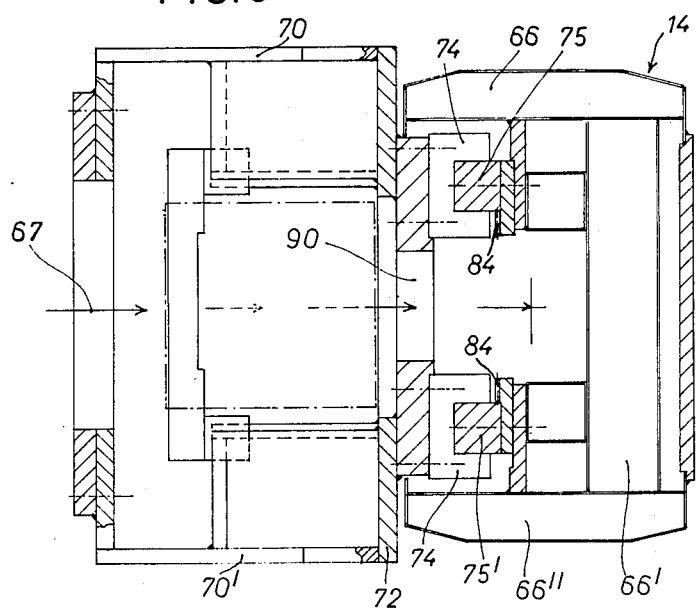
FIG. 5 is a view along arrow "C" of FIG. 4, with the robot and the control assembly partially cutaway.

One end of the hollow shaft 62 is firmly secured to a structural framework 68 substantially comprising two reinforcement flanges 70, 70', joined together by a closure plate 72 carrying two pairs of axial circulating balls bearings 74, 74' as shown in FIGS. 4 and 5.

The framework 68 integrally rotates with the hollow shaft 62 about the axis of this latter coincident with the path of the laser beam 67 (axis II). The framework 68 is a part of the guide and motor assembly 13 for translating the arm 14 in a vertical plane (axis III). The arm 14 comprises three metal box-type sections 66, 66', 66" substantially forming a "U" which are firmly secured together so as to prevent any possible vibration or torsion during the vertical translation movement.

Two vertical guides 75, 75' internally connected to the arm 14 slide inside the already mentioned bearings 74, 74'.

The electric motor 76, equipped with rotative transducer 78 imparts the rotating motion to a reduction and motion transmission unit 80 reducing the number of revolutions, which rotatably acts upon a pair of pinions 82 which in turn engage a pair of racks 84 secured to the straight guides 75, 75'.

Two rubber stops 86 fastened to the framework 68 define the maximum extension of the arm 14.

A mirror 88, positioned at 45° inside the arm 14 and secured to the framework 68 through a small attachment arm 89, acts as a reflecting member for the beam 67 outcoming from a power laser generator 110 placed outside the robot. Of course the mirror 88 is as swingable as the framework 68 to which it is secured, and it is located in the center of rotation of the swinging arm (axis II), in such a way that the laser beam striking its center is reflected along said arm 14 whichever may be the angular position assumed by this latter during its swinging movements.

A wide vertical slit, schematically shown in FIG. 2 and that can also be seen in FIG. 5, is formed along the robot arm 14, in the side facing the laser generator 110 and in the plate 72 of the framework 68. It extends for the entire run of the axis III and let the laser beam strike the mirror 88 for any position of the arm along the axis III. Moreover the slit 90 makes quite easier the cleaning operations or the replacement of the mirror 88 without requiring difficult disassembly operations and setting of the mirror.

At the lower end of the arm 14 there is coupled an operating head 16 adapted to space orient the laser beam 67 in accordance with a predetermined program.

An example of an operating head suitable for such purpose can be found in U.S. Pat. No. 4,667,274 issued on June 30th, 1987 and assigned to the same applicant.

In that example it is disclosed a hollow head with three degrees of freedom of movement, which is internally provided with a pair of mirrors adapted to reflect outside a laser beam and direct it onto a workpiece.

Figure 6:
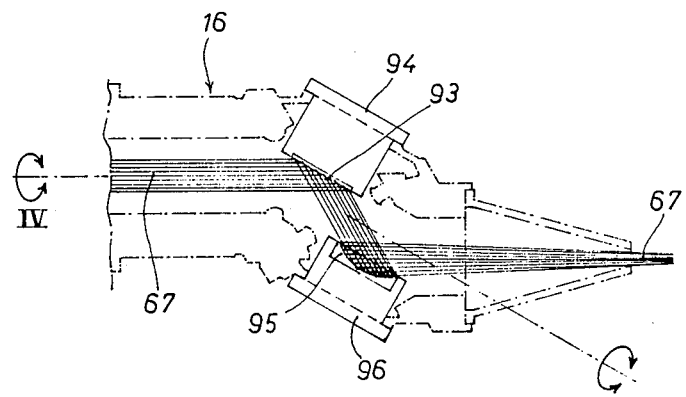
FIGS. 6, 7 and 8 schematically show the robot operating head in embodiments with two or three polar axes.
Figure 7:
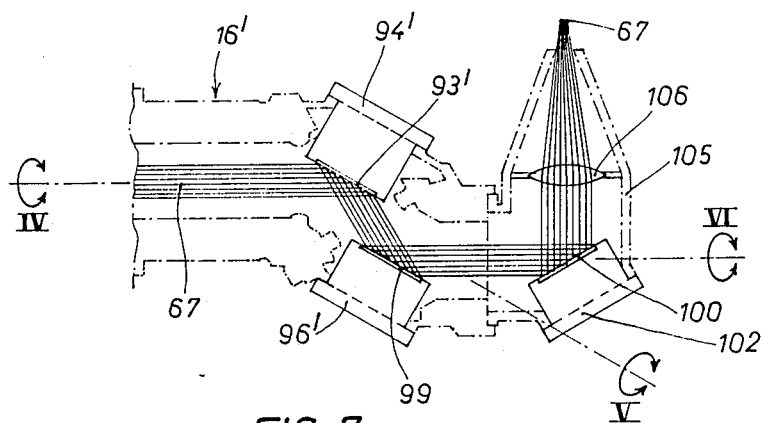
Figure 8:
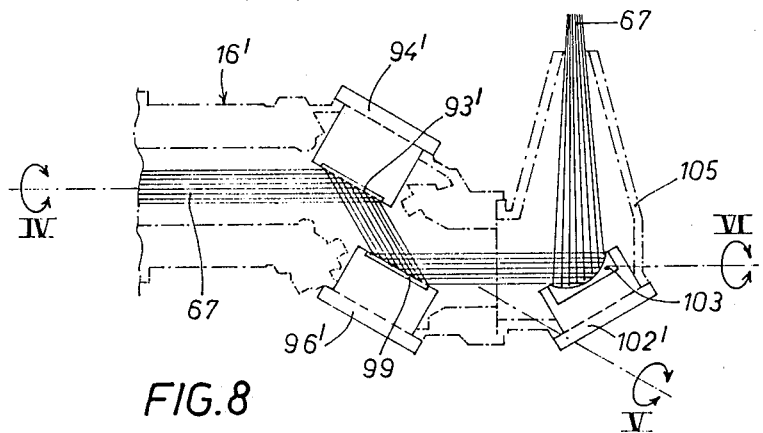

A head of the above type is schematically illustrated in FIGS. 6, 7 and 8.

With reference to FIG. 6, it has been shown an operating hollow head 16 with two polar axes IV and V wherein the laser beam 67 coming from mirror 88 strikes a second mirror 93 mounted on an adjustable holder and then a parabolic focusing mirror 95 mounted on an adjustable holder 96 from which a focused laser beam 67 emerges.

On the other hand FIGS. 7 and 8 relate to a situation wherein the head 16 is provided with three polar axes IV, V and VI with a total of six axes associated to the robot.

In such case (FIG. 7) a third plane mirror 99 can be provided instead of the parabolic mirror 95, still mounted on an adjustable holder 96'. The laser beam reflected by the mirror 99 will strike a further mirror 100 mounted on an adjustable holder 102 which is housed inside the terminal section 105 of the head, inside which it is also provided a lens 106 for focusing the beam at a point outside the head.

Alternatively; a pair of plane mirrors 93', 99 can be associated to a parabolic mirror 103 (FIG. 8) for focusing the beam at a point outside the head.

In summary, the movements that the robot of the present invention is able to accomplish are the following:

the first movement is a longitudinal translation on platform 17, of base 24 carrying the robot along two straight guides 26 and 28 which are connected to the portal framework 10 (axis I in FIG. 1);

the second movement is a swinging motion of arm 14 with an amplitude of about 60°, with center on the axis passing along the hollow shaft 62 (axis II in FIG. 2);

the third movement is a rectilinear translation in a vertical plane of the arm 14 slidable on guides 75, 75' (axis III in FIG. 4);

the two or three angular movements of head 16 or 16' (axis IV, V or VI).

Among the advantages of the laser beam robot of the present invention, there is that of a limited number of reflecting mirrors required to send back and direct the laser beam onto the workpieces. This advantage is apparent in the reduced number of maintenance operations to be carried out on the reflecting mirrors and in the reduced power loss associated to each reflection.

Another considerable advantage resides in the large space within which the robot arm can operate which considerably limits the costly moving of the workpiece.

A presently preferred embodiment of the invention has been disclosed, but of course the same allows for a number of modifications and changes within the scope of the inventive idea.

I claim:

1. A laser beam robot with a hollow operating head mounted on a portal framework with at least five axes defined as follows:
   I. A horizontal rectilinear axis for translating the robot along the portal framework;
   II. a swinging axis for swinging the robot in a vertical plane;
   III. a linear axis for translating the robot in the same vertical plane;
   IV-V. at least two polar axes in the hollow head; comprising:
   a slit overlapping the center of rotation of said swinging axis and extending on the robot side facing an external laser generator from which the laser beam exits along a rectilinear path;
   a first mirror positioned in the center of rotation of said swinging axis and secured thereto, which reflects the laser beam from the generator within the robot toward the operating head;
   at least another reflecting mirror and a focusing unit in said hollow operating head for orienting and, focusing the laser beam according to a desired path outside the robot.

2. A laser beam robot as claimed in claim 1, wherein said axis I is formed by two straight guides fastened to the upper part of crossbars the upper plane of which forms a platform of the portal framework for sliding a base carrying a guide and motor assembly for the linear translation movement of an arm, axis III, and a control assembly for the swinging movement of said arm in a vertical plane, axis II.

3. A laser beam robot as claimed in claim 2, wherein said base is moved in the linear translation movement by a pinion secured to the base and driven by an electric motor equipped with a rotative transducer for position detecting, which engages a rack located on the platform parallel to one of said guides.

4. A laser beam robot as claimed in claim 1, wherein said base carries a rotatable hinge holder for a hollow body inside which it is housed a worm screw engaging a tapped sleeve slidable thereon, which laterally carries two pins mounting a pair of connecting rods firmly connected to a hollow shaft to define the angular displacements, the laser beam travelling within said hollow shaft which is firmly secured at one end to the robot arm.

5. A laser beam robot as claimed in any one of claims 1-4, wherein the motor means to obtain a swinging movement of the control assembly comprises an electric motor equipped with a rotative transducer and a reduction unit of the number of revolutions of said electric motor, said reduction unit being rotatably coupled to the above worm screw.

6. A laser beam robot as claimed in any one of claims 1 and 2, wherein said guide and motor assembly for the vertical linear translation movement of the arm comprises a structural framework providing for a slit for the passage of said laser beam and mounting a double pair of axial circulating balls bearings inside which can slide two straight guides internally fastened to said arm.

7. A laser beam robot as claimed in any one of claims 1-4, wherein the motor of said guide and motor assembly is an electric motor equipped with rotative transducer for position detecting, and with a unit for the reduction of the revolution number and the transmission of the motion, said motor engaging with a pair of pinions which in turn engage a pair of racks fastened to said straight guides.

8. A laser beam robot as claimed in claim 2, wherein said reflecting mirror is fastened to a guide and motor assembly through a small arm extending inside of said arm in such a way as to perpendicularly reflect the incident laser beam.

9. A laser beam robot as claimed in claim 1, wherein said focusing unit comprises a parabolic mirror or a lens.

10. A laser beam robot as claimed in any one of claims 1 and 9, where in said hollow operating head with two polar axes comprises a plane reflecting mirror and a parabolic focusing mirror.

11. A laser beam robot as claimed in any one of claims 1 and 9, wherein said hollow operating head with three polar axes comprising three plane reflecting mirrors and a focusing lens.

12. A laser beam robot as claimed in any one of claims 1 and 9, wherein said hollow operating head with three polar axes comprises two plane reflecting mirrors and a parabolic focusing mirror.

* * * * *